E. BELLAN AND H. L. LAINÉ.
DEVICE FOR SECURING RAILWAY RAILS TO THEIR SLEEPERS.
APPLICATION FILED APR. 12, 1919.

1,395,663.

Patented Nov. 1, 1921.
3 SHEETS—SHEET 1.

Inventors:
Eugène Bellan + Henri Léon Lainé
per
H. W. Plucker
Attorney.

E. BELLAN AND H. L. LAINÉ.
DEVICE FOR SECURING RAILWAY RAILS TO THEIR SLEEPERS.
APPLICATION FILED APR. 12, 1919.
1,395,663.
Patented Nov. 1, 1921.
Fig. 5.
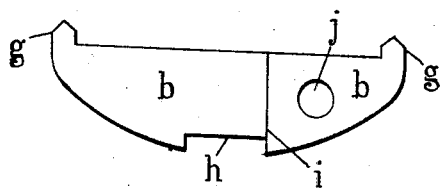
Fig. 10.
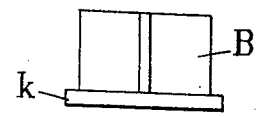
Fig. 6.
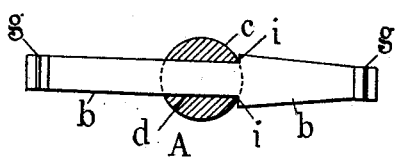
Fig. 11.
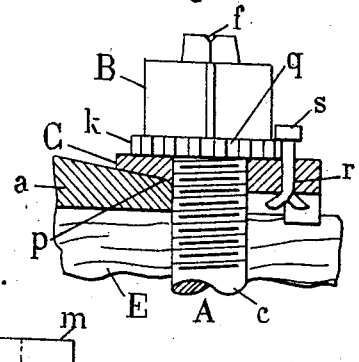
Fig. 7.
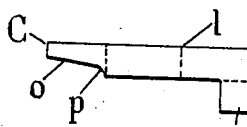
Fig. 9.
Fig. 12.
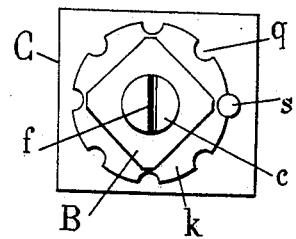
Fig. 8.
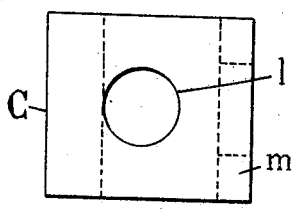
Fig. 13.
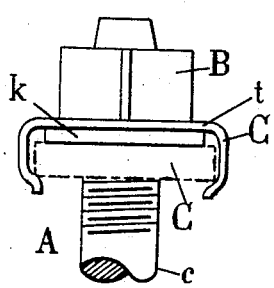
Fig. 14.
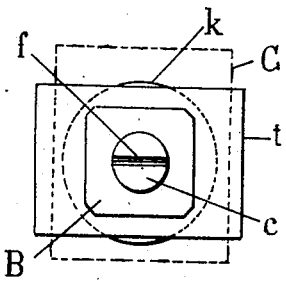
Inventors:
Eugène Bellan + Henri Léon Lainé
per H. W. Plucker
Attorney.

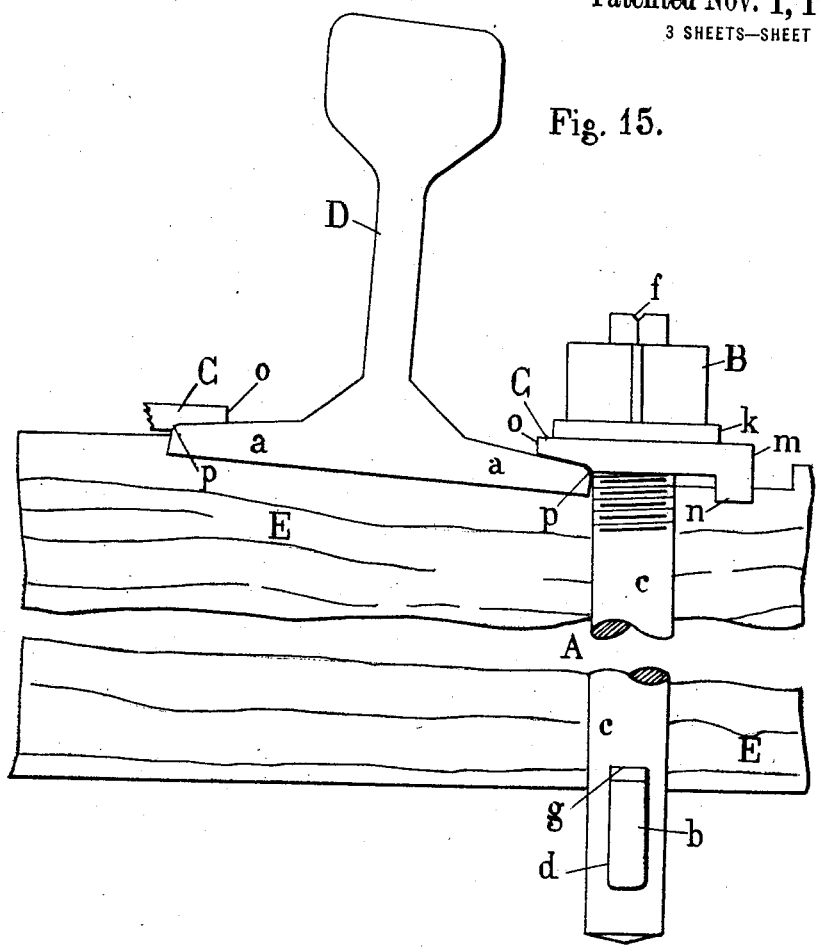
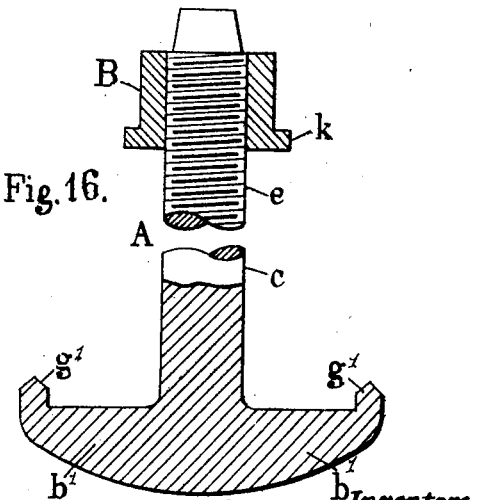

UNITED STATES PATENT OFFICE.

EUGÈNE BELLAN AND HENRI LÉON LAINÉ, OF PARIS, FRANCE.

DEVICE FOR SECURING RAILWAY-RAILS TO THEIR SLEEPERS.

1,395,663.             Specification of Letters Patent.     Patented Nov. 1, 1921.

Application filed April 12, 1919.  Serial No. 289,751.

*To all whom it may concern:*

Be it known that we, EUGÈNE BELLAN, resident of 139bis Avenue de Villiers, Paris, France, and HENRI LÉON LAINÉ, resident of 139bis Avenue de Villiers, Paris, France, both citizens of France, have invented a Device for Securing Railway-Rails to Their Sleepers, (for which I have filed applications in Belgium May 5, 1914, and for additional patent June 15, 1914,) of which the following is a clear, full, and exact description.

The present invention has for its object to provide an improved device for securing railway rails to their wooden sleepers.

This device consists of an anchor bolt engaged in the whole thickness of the sleeper, of a claw strung on the stem of this bolt for bearing upon the foot of the rail, of a nut screwed down on to this claw and of means for preventing the nut from becoming unscrewed in consequence of the vibrations resulting from the passage of the trains The anchor bolt of this device has horizontal arms which engage underneath the sleeper in a transverse direction. These arms, which are either removable or integral with the bolt stem, have at their ends vertical lugs which enter into the wood of the sleeper under the action exerted by the lock nut, for the purpose of preventing this bolt from rotating when the nut is screwed and also to prevent the sleeper from splitting.

By way of example, this invention will be described hereinafter with reference to the accompanying drawing in which:

Fig. 5 shows in side view the arms of the anchor detached.

Fig. 6 is a horizontal section corresponding to Fig. 4 and taken on a level with the upper part of the arms of the anchor.

Fig. 7 shows detached the claw forming part of the device.

Fig. 8 represents the same claw in plan corresponding to Fig. 7.

Fig. 9 shows the same claw from the side of the hooks, that is to say looking toward the rail.

Fig. 10 represents detached, in elevation, the nut of the anchor bolt.

Fig. 11 shows in front view, partially in section, a means for preventing the said nut from becoming unscrewed.

Fig. 12 is a plan view corresponding to Fig. 11.

Fig. 13 represents in side view another means adapted to prevent the said nut from becoming unscrewed.

Fig. 14 is a plan view corresponding to Fig. 13.

Fig. 15 shows the entire device as applied to a web footed rail.

Fig. 16 represents in side view a modification of the anchor bolt and its lugs.

Figure 1:
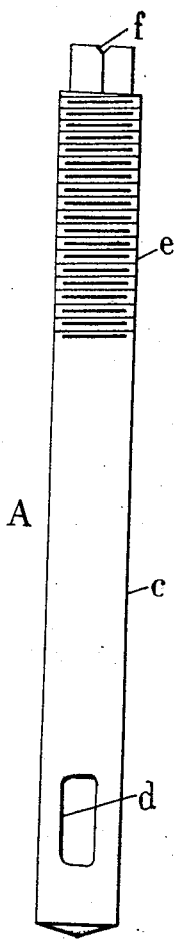
Figure 1 represents detached, in front view, the anchor rod forming part of this device.
Figure 2:
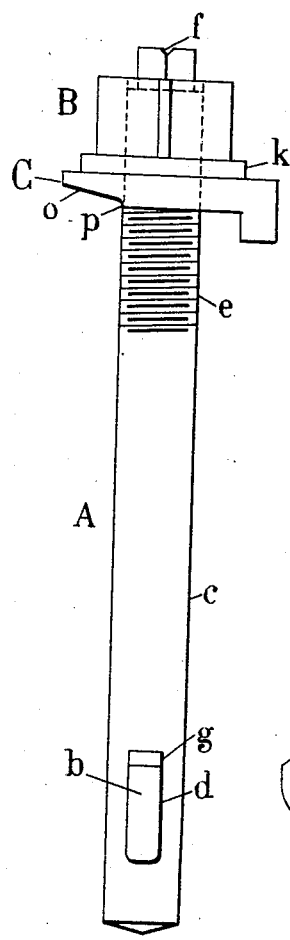
Fig. 2 shows in front view the whole of the device in question.
Figure 4:
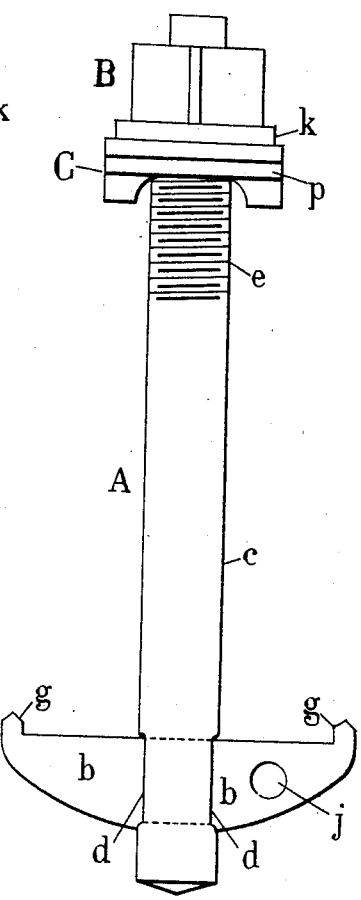
Fig. 4 represents the device in side view, this view being taken at the side of the rail.
Figure 3:
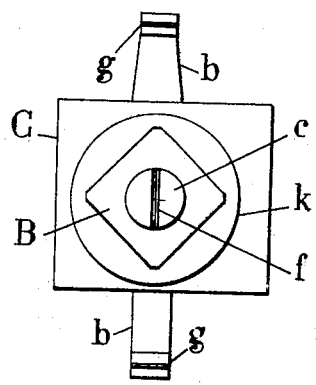
Fig. 3 is a plan view corresponding to Fig. 2.

The arms $b$ of the anchor bolt A are arranged parallel with the rail D on the sleeper E, while the claw C is arranged at right angles to the rail.

The bolt A has a cylindrical stem $c$ formed with a mortise $d$ at its lower part, screw threaded at $e$ at its upper part and provided with a mark $f$ on its upper end to indicate the direction of the mortise $d$.

The mortise $d$ receives in a removable manner the arms of the anchor arms $b$ (see Fig. 5), which have a vertical recess $h$ at their lower part, two lateral shoulders $i$ on one of the arms and a perforation $j$ made in the shouldered arm. The lugs $g$ are intended to penetrate into the wood of the sleeper E so as to prevent the bolt from rotating when the nut B is screwed down, and to prevent the sleeper from splitting.

The object of the shoulders $i$ is to arrest the anchor arms in correct position for the mortise $d$ to engage the recess $h$, the final position of the arms being insured by the descent of this recess $h$ onto the lower edge of the mortise $d$.

The perforation $j$ is provided for the purpose of facilitating the disengagement of the arms from the said mortise when necessary. For this purpose, a hook may be inserted in this perforation.

The nut B of the anchor bolt is preferably square and has a cylindrical base or fillet $k$ for the purpose of insuring a uniform engagement in all the positions which it may occupy around the stem.

The claw C is pierced with an eye $l$ so as to receive with slight play the stem $c$ of the anchor bolt and at its side remote from the rail the claw C has a heel $m$ provided with two strong depending hooks $n$. On the side next to the rail this claw has a lug or inclined plane $o$, adapted to fit the foot $a$ of the rail on which it bears strongly and this claw is also provided with an ear $p$ bearing against the said foot, for the purpose of preventing the foot from turning during the initial movements in the screwing down of the nut B.

The hooks $n$ of the claw are adapted to serve the following purposes:

1. They are intended to penetrate strongly into the wood of the sleeper under the action of the nut B, to give the claw its normal position.

2. Having penetrated into the wood of the sleeper, they serve as abutments with the whole of the claw to prevent the device from receding or bending outward.

3. To prevent the claw from rotating due to the approach of the rail.

The lug $o$ and the heel $m$ of the claw are not at the same distance from the anchor bolt, the heel being at a greater distance than the lug, this being for the purpose of insuring a good seat for the claw.

It should be noted that, by virtue of the interposed claw C the creeping of the rail cannot cause the nut B to become unscrewed, as is the case with the wood screws the head of which bears directly upon the head of the rail.

It should also be noted that the lug $o$ of the claw has a flat surface parallel with the foot $a$ of the rail, so that the rail is held by a large flat surface and not by a conical head against which the rail is simply tangential, as in the ordinary fastening by means of wood screws.

The cutting and boring of the sleepers receiving this device are carried out in the ordinary way. The boring is of a diameter very little larger than the stem of the anchor bolt, which stem is itself of a diameter equal to the ordinary wood screws. This boring is cylindrical and is made through the whole thickness of the sleepers.

For new tracks, each of the two rails may be fixed to its sleepers by two devices (one on each side) so that only 20 devices are employed for 10 sleepers, instead of 30 wood screws.

For the reinforcement of tracks already in existence, it will suffice to replace all the wood screws individually by one of these devices, say 10 devices per rail for 10 sleepers, the holes in the sleepers remaining the same.

The parts constituting this device may be protected against oxidation by any suitable means.

At places where there are points and for the attachment of the chairs on tracks laid with double headed rails, etc., the special anchor bolt of this device will be used without its claw.

To prevent the nut from becoming unscrewed owing to vibration, grooves $q$ may be made in the periphery of the base $k$ of the nut B and a perforation $r$ in the heel of the claw C between the two hooks $n$ so as to allow a stop pin $s$ to be driven into the groove corresponding to the perforation as shown in Figs. 11 and 12 of the drawing. This pin, which may be of brass or steel, may be easily removed and put back into place after screwing the nut farther down as required.

A yoke spring $t$ may also be employed for the same purpose so that after being fitted to the head of the nut and resting upon its base, it will embrace the sides of the claw as shown in Figs. 13 and 14 of the drawing, the sides of this yoke forming springs.

The arms with anchor lugs may also be made in a single piece with the stem $c$ as shown at Fig. 16 in which the integral anchor arms $b'$ are shown with lugs $g'$.

For tracks designed to be dismantled, the head of the stem, above the nut may be surmounted by a small grease cup formed by a cap.

The claw C, strung on to the stem of the anchor introduced into the sleeper, is screwed down by the aid of the nut in a manner sufficient to cause the hooks $n$ to penetrate into the sleeper.

At the same time, the lugs $g'$ on the anchor penetrate also into the wood of the sleeper until the upper side of the arms bears beneath this sleeper.

The nut is then secured by means of the pin or the yoke above mentioned.

The rails thus fixed on both sides, by similar devices furnish a track offering a resistance unknown up to the present time, and thus permitting of the passage with safety of heavy modern rolling stock.

The forms, details, accessories, materials and dimensions of this device may be varied within the scope of the claims without in any way changing thereby the principle of the invention.

Claims:

1. A device for securing rails to their sleepers comprising an anchor bolt, formed with a mortise at its lower end, a claw encircling the stem of the bolt for engaging the foot of the rail, a nut screwed on the stem and engaging the claw, means for preventing loosening of the nut, anchor arms fitted in said mortise, means for centering the said arms in the mortise, and hook members on the said claw and lug members on the anchor arms for engaging and penetrating the sleeper and preventing splitting.

2. A device for securing rails to their sleepers comprising an anchor bolt, having a stem screwthreaded at its upper end and formed with a mortise at its lower end, a nut on the stem, anchor arms removably mounted in the mortise, upwardly extending lugs on the said arms adapted to penetrate into the wood of the sleeper for preventing the bolt from rotating and for preventing the sleeper from splitting, the anchor arms being formed at their edge with a centering recess and with two stop shoulders, and the nut being formed with an extended base for insuring a uniform engagement over its entire lower surface.

3. A device for securing rails to their sleepers comprising an anchor bolt, formed with a mortise at its lower end, a claw on the stem of the bolt, a lug on the claw adapted to bear on the foot of the rail for holding it, an ear on the claw adapted to bear on the edge of the rail for preventing the claw from rotating during the initial tightening of the nut, a heel on the claw with hooks adapted to penetrate into the sleeper and to form abutments for preventing the device from receding or bending outward and also for preventing the claw from turning and the sleeper from splitting, anchor arms removably fitted in said mortise, means for centering the said arms in the mortise, and lug members on the upper edges of the anchor arms for penetrating the underside of the sleeper.

The foregoing specification of our device intended for the fixation of railway rails to their wooden sleepers, signed by us, this 20th day of March, 1919.

EUGÈNE BELLAN.
HENRI LÉON LAINÉ.